(12) United States Patent
Hirt

(10) Patent No.: US 11,570,418 B2
(45) Date of Patent: Jan. 31, 2023

(54) TECHNIQUES FOR GENERATING LIGHT FIELD DATA BY COMBINING MULTIPLE SYNTHESIZED VIEWPOINTS

(71) Applicant: CREAL SA, Ecublens (CH)

(72) Inventor: Grégoire André Joseph Hirt, Vaud (CH)

(73) Assignee: CREAL SA, Ecublens (CH)

(*) Notice: Subject to any disclaimer, the term of this patent is extended or adjusted under 35 U.S.C. 154(b) by 0 days.

(21) Appl. No.: 17/350,942

(22) Filed: Jun. 17, 2021

(65) Prior Publication Data

US 2022/0408070 A1 Dec. 22, 2022

(51) Int. Cl.
| | |
|---|---|
| H04N 13/156 | (2018.01) |
| H04N 13/111 | (2018.01) |
| H04N 13/00 | (2018.01) |
| H04N 13/282 | (2018.01) |

(52) U.S. Cl.
CPC ......... *H04N 13/156* (2018.05); *H04N 13/111* (2018.05); *H04N 13/282* (2018.05); *H04N 2013/0088* (2013.01)

(58) Field of Classification Search
CPC .. H04N 13/156; H04N 13/111; H04N 13/282; H04N 2013/0088
USPC .......................................................... 348/43
See application file for complete search history.

(56) References Cited

U.S. PATENT DOCUMENTS

| | | | |
|---|---|---|---|
| 7,800,608 B2 | 9/2010 | Kim et al. | |
| 8,224,107 B2 | 7/2012 | Gardella et al. | |
| 8,577,184 B2 | 11/2013 | Young | |
| 8,619,071 B2 | 12/2013 | Kopf et al. | |
| 8,660,362 B2 | 2/2014 | Katz et al. | |
| 8,767,042 B2 | 7/2014 | Mizutani | |
| 8,860,833 B2 | 10/2014 | Georgiev et al. | |
| 9,053,573 B2 | 6/2015 | Lin et al. | |

(Continued)

FOREIGN PATENT DOCUMENTS

| | | |
|---|---|---|
| EP | 2249312 A1 | 11/2010 |
| EP | 2609575 B1 | 2/2019 |

(Continued)

OTHER PUBLICATIONS

Fachada, Sarah, et al., "Depth image based view synthesis with multiple reference views for virtual reality," Laboratories of Image, Signal processing and Acoustics Universite Libre de Bruxelles (last retrieved on Aug. 18, 2021 from: http://dipot.ulb.ac.be/dspace/bitstream/2013/270850/3/paper_3DTV_CON_final.pdf), 2018 (4 pages).

(Continued)

*Primary Examiner* — Tung T Vo
(74) *Attorney, Agent, or Firm* — Wilmer Cutler Pickering Hale and Dorr LLP

(57) ABSTRACT

Techniques for efficiently generating and displaying light-field data are disclosed. In one particular embodiment, the techniques may be realized as a method for generating light-field data, the method comprising receiving input image data, synthesizing a first plurality of viewpoints based on the input image data, synthesizing a second plurality of viewpoints based on cached image data, combining the first and second plurality of viewpoints, yielding a plurality of blended viewpoints, displaying the plurality of blended viewpoints, and caching image data associated with the plurality of blended viewpoints.

21 Claims, 4 Drawing Sheets

(56) References Cited

U.S. PATENT DOCUMENTS

| | | | |
|---|---|---|---|
| 9,147,278 | B2 | 9/2015 | Isogai et al. |
| 9,558,579 | B2 | 1/2017 | Lee et al. |
| 9,729,845 | B2 | 8/2017 | Chang et al. |
| 10,229,529 | B2 | 3/2019 | Lum et al. |
| 10,332,307 | B2 | 6/2019 | Jin |
| 10,362,289 | B2 | 7/2019 | Salvi et al. |
| 10,785,471 | B1* | 9/2020 | Hunt .................... H04N 13/366 |
| 10,803,553 | B2 | 10/2020 | Foi et al. |
| 10,853,918 | B2 | 12/2020 | Ho et al. |
| 10,930,054 | B2 | 2/2021 | Zhang |
| 2007/0188501 | A1* | 8/2007 | Yee ........................ G06T 15/20 345/473 |
| 2011/0157229 | A1 | 6/2011 | Ni et al. |
| 2015/0116312 | A1 | 4/2015 | Baik |
| 2015/0363976 | A1* | 12/2015 | Henson ................ H04N 13/279 345/419 |
| 2017/0337730 | A1 | 11/2017 | Vetter |
| 2019/0311524 | A1 | 10/2019 | Wang et al. |
| 2020/0342571 | A1 | 10/2020 | Young et al. |
| 2020/0342577 | A1 | 10/2020 | Rodriguez et al. |
| 2021/0014450 | A1 | 1/2021 | Schluessler et al. |
| 2021/0092444 | A1* | 3/2021 | Ilola .................... H04N 19/142 |
| 2021/0165229 | A1* | 6/2021 | Stahl .................... H04N 19/543 |
| 2021/0192681 | A1* | 6/2021 | Mironov ............... G06T 3/0056 |
| 2021/0209729 | A1* | 7/2021 | Francois ............... G06T 3/4038 |
| 2021/0312698 | A1* | 10/2021 | He ........................ G06V 10/40 |

FOREIGN PATENT DOCUMENTS

| | | |
|---|---|---|
| WO | WO-2018/063579 A1 | 4/2018 |
| WO | WO-2018/091984 | 5/2018 |

OTHER PUBLICATIONS

Mildenhall, Ben, et al., "NeRF: Representing Scenes as Neural Radiance Fields for View Synthesis," (last retrieved on Aug. 18, 2021 from: https://arxiv.org/pdf/2003.08934.pdf), 2020 (25 pages).

Schütz, Markus, et al., "Rendering Point Clouds with Compute Shaders" (last retrieved on Aug. 18, 2021 from: https://arxiv.org/pdf/1908.02681.pdf), 2019 (2 pages).

Birklbauer et al., "Rendering Gigaray Light Fields," Computer Graphics Forum: Journal of the European Association for Computer Graphics, May 6, 2013, vol. 32, No. 2, pp. 469-478.

International Search Report and Written Opinion dated Nov. 9, 2022, in the International Application No. PCT/IB2022/000301. 13 pages.

Overbeck et al., "A system for Acquiring, Processing, and Rendering Panoramic Light Field Stills for Virtual Reality," ACM Transactions on Graphics, Nov. 2018, vol. 37, issue 6, No. 197, pp. 1-15, arXiv: 1810.08860v1, Oct. 20, 2018.

Takano et al., "Improved Displaying System for HMD with Focusing on Gazing Point Using Photographed Panorama Light Field," Proceedings of The 5th IIAE International Conference on Intelligent Systems and Image Processing, Sep. 7-12, 2017, pp. 330-334.

\* cited by examiner

TECHNIQUES FOR GENERATING LIGHT FIELD DATA BY COMBINING MULTIPLE SYNTHESIZED VIEWPOINTS

FIELD OF THE DISCLOSURE

The present disclosure generally relates to generating light-field data and, more particularly, to techniques for generating light-field data by combining multiple synthesized viewpoints.

BACKGROUND OF THE DISCLOSURE

A light-field represents the flux of light as it exists in the real world; it reconstructs the direction and radiance of light rays passing through a certain area of space. A light-field can be generated by projecting images to the eye from many slightly shifted viewpoints, simultaneously or nearly simultaneously, providing monocular depth cues.

In practical implementations, a light-field image is projected using multiple discrete viewpoints, where each viewpoint corresponds to an image projected to the eye from a particular perspective. The techniques used to generate and render these viewpoints therefore impact the visual quality of the light-field and the rendering performance.

Thus, it may be understood that there may be a need for improved techniques for generating viewpoints of a light-field.

SUMMARY OF THE DISCLOSURE

Techniques for generating and displaying light-field data are disclosed. In one particular embodiment, the techniques may be realized as a method for generating light-field data, the method comprising receiving input image data, synthesizing a first plurality of viewpoints based on the input image data, synthesizing a second plurality of viewpoints based on cached image data, combining the first and second plurality of viewpoints, yielding a plurality of blended viewpoints, displaying the plurality of blended viewpoints, and caching image data associated with the plurality of blended viewpoints.

In accordance with other aspects of this particular embodiment, the input image data is associated with a subset of viewpoints among the plurality of viewpoints in the three-dimensional scene.

In accordance with other aspects of this particular embodiment, the input image data has a lower resolution than a resolution of the displayed plurality of blended viewpoints.

In accordance with other aspects of this particular embodiment, synthesizing the first plurality of viewpoints includes scaling (e.g., upscaling) the input image data.

In accordance with other aspects of this particular embodiment, synthesizing the second plurality of viewpoints includes modifying the cached image data based on data associated with the first plurality of viewpoints.

In accordance with other aspects of this particular embodiment, the cached image data includes image data associated with one or more viewpoints displayed in a previous frame.

In accordance with other aspects of this particular embodiment, synthesizing the first plurality of viewpoints comprises generating a first plurality of confidence maps corresponding to the first plurality of viewpoints, and synthesizing the second plurality of viewpoints comprises generating a second plurality of confidence maps corresponding to the second plurality of viewpoints.

In accordance with other aspects of this particular embodiment, each confidence map among the first plurality of confidence maps and the second plurality of confidence maps comprises a plurality of confidence levels, and each confidence level estimates a quality of a synthesized pixel among the first plurality of viewpoints and the second plurality of viewpoints.

In accordance with other aspects of this particular embodiment, each confidence level comprises one or more of a binary value or a scalar value.

In accordance with other aspects of this particular embodiment, each confidence level is determined based on at least a scaling confidence and a reprojection confidence.

In accordance with other aspects of this particular embodiment, combining the first and second plurality of viewpoints comprises comparing the first and second plurality of confidence maps.

In accordance with other aspects of this particular embodiment, combining the first and second plurality of viewpoints further comprises determining, for each pixel, based on comparing the first and second plurality of confidence maps, whether to use image data from the first plurality of viewpoints, the second plurality of viewpoints, or a combination thereof.

In accordance with other aspects of this particular embodiment, displaying the plurality of blended viewpoints comprises time-domain multiplexing the plurality of blended viewpoints.

In accordance with other aspects of this particular embodiment, caching the image data is performed at substantially the same time as displaying the plurality of blended viewpoints.

In accordance with other aspects of this particular embodiment, caching the image data comprises compressing the image data. the input image data comprises compressed input image data, and wherein the method further comprises decompressing the compressed input image data.

In accordance with other aspects of this particular embodiment, the compressed input image data comprises pre-rendered image data.

In accordance with other aspects of this particular embodiment, the input image data is received at an endpoint device from a remote source.

In accordance with other aspects of this particular embodiment, the endpoint device comprises a headset configured to project the plurality of blended viewpoints to a user.

In accordance with other aspects of this particular embodiment, the at least one computer processor comprises at least one of an application specific integrated circuit or a field programmable gate array of the endpoint device.

In another particular embodiment, the techniques may be realized as a system for generating light-field data comprising at least one computer processor communicatively coupled to and configured to operate in the system, wherein the at least one computer processor is further configured to perform the steps in the above-described method.

In another particular embodiment, the techniques may be realized as an article of manufacture for generating light-field data with a light-field processing system comprising a non-transitory processor readable medium and instructions stored on the medium, wherein the instructions are configured to be readable from the medium by at least one computer processor communicatively coupled to and configured to operate in the light-field processing system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 4:
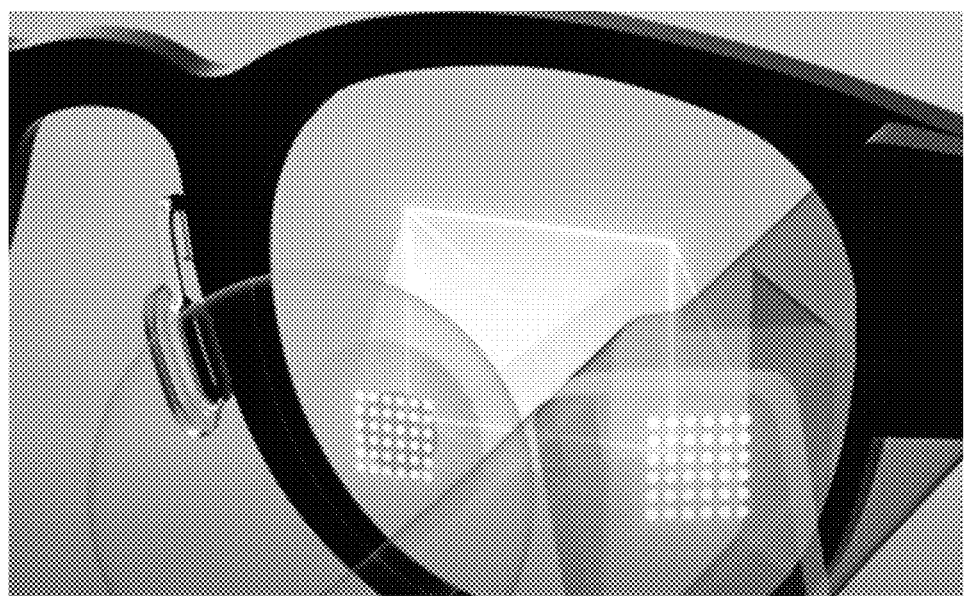
FIG. 4 shows an illustrative example of a near-eye light-field projector 400 according to some embodiments.

Generating a light-field frame (e.g., a collection or sequence of viewpoints in a 3D scene) using existing techniques may be computationally inefficient. As an example, a light-field may include a plurality of viewpoints per eye (e.g., 36 viewpoints arranged as a 6×6 grid of images as shown in FIG. 4). Computing image data for each view by existing brute force methods may therefore increase the rendering requirements by about 36 times, in this example. However, it is expected that the various viewpoints may be similar to each other, e.g., in space (similar images at different locations in the grid) and in time (similar images among different frames). Rendering each image independently is therefore an inefficient use of computational resources, as it may not exploit the redundancy among the different viewpoints in space and time.

The techniques described herein can improve the performance (e.g., speed and computational efficiency) and visual quality of real-time rendering of dense, discrete, high-resolution multi-view visual data of a 3D scene. For example, the techniques may be suitable for multi-view based light-fields. In some examples, the techniques may yield more efficient compression of visual data for transmission between the point of their origin and their visual output. These techniques can be also employed for efficient storage of pre-rendered high-quality visual data, allowing their later output for viewing with much lower requirements on computing resources compared to rendering.

Figure 1:
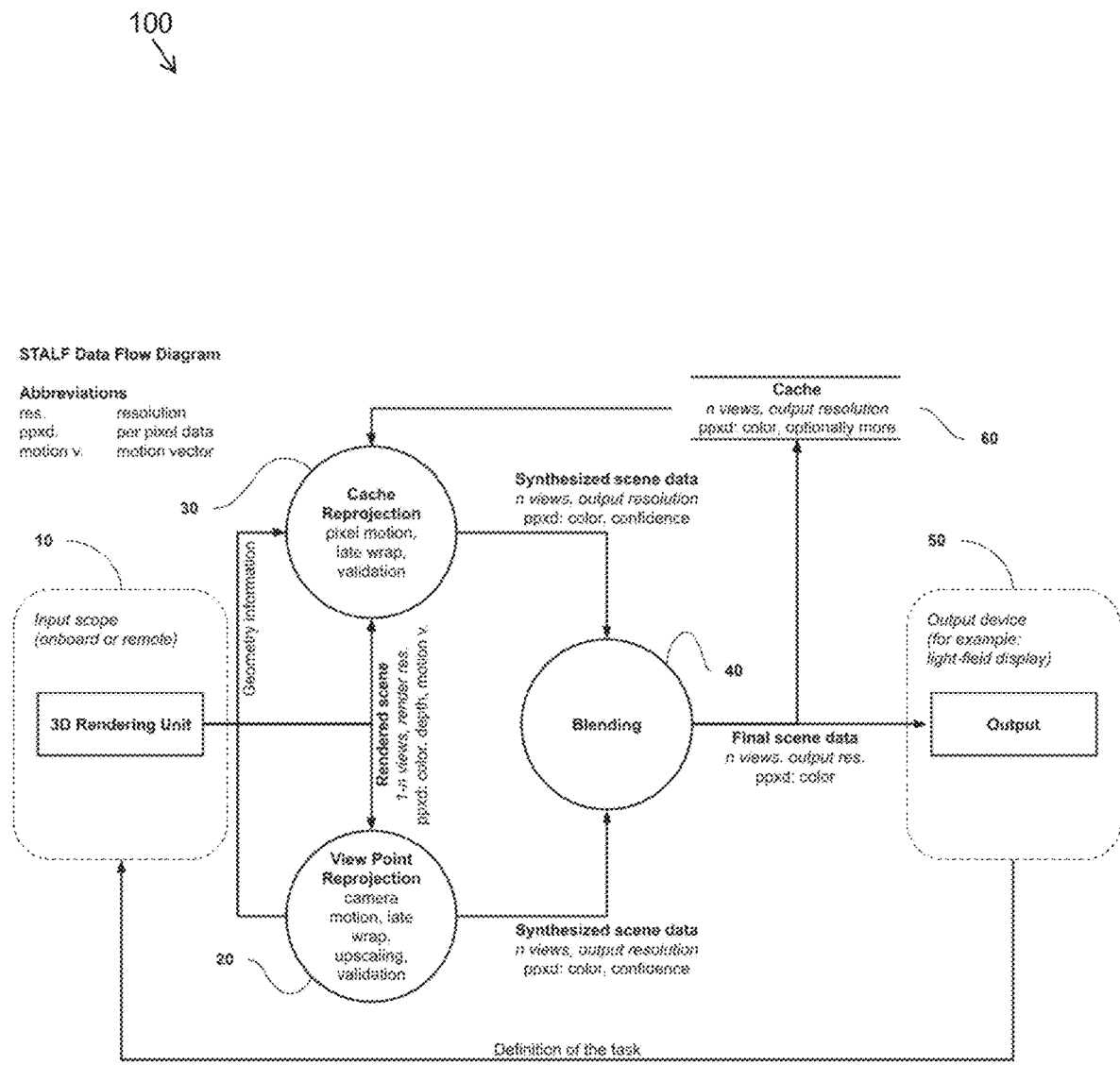
FIG. 1 shows a simplified diagram of a light-field processing system 100 according to some embodiments.

FIG. 1 is a simplified diagram of a light-field processing system 100 according to some embodiments. In some embodiments, light-field processing system 100 may be configured to render, store, transmit, and display a plurality of viewpoints of a light-field (e.g., a 3D scene) in an efficient manner.

As shown in FIG. 1, visual and geometric data rendered by a rendering unit 10 serve as an input (or "ground truth") for light-field processing system 100. Rendering unit 10 receives information from an output device 50 to determine which view to render. Data from rendering unit 10 is provided to two reprojection units: a viewpoint reprojection unit 20 and a cache reprojection unit 30. Viewpoint reprojection unit 20 synthesizes each of the plurality of viewpoints using a viewpoint reprojection from the ground truth (looking at the same scene from different viewpoints). Cache reprojection unit 30 uses geometry information for each viewpoint (e.g., motion vectors per pixel) and cached viewpoint data from a previous frame, to generate another version of the same plurality of viewpoints. Each of the reprojection units 20 and 30 also generates an accompanying confidence map for each viewpoint. A blending unit 40 receives the synthesized viewpoint data from each of reprojection units 20 and 30, and the corresponding confidence maps, and blends the synthesized viewpoint data to a single image per viewpoint, using the confidence maps to decide which data (e.g., which of reprojection units 20 and 30) to use as a source. The blended data is sent to an output device 50 for display and stored in a cache unit 60. These components of FIG. 1 are described in further detail below.

In some embodiments, rendering unit 10 may generate input image data for light-field processing system 100. The input image data may include one or more viewpoints among the plurality of viewpoints in the 3D scene to be displayed. In general, the input image data may be a subset of the plurality of viewpoints, possibly one viewpoint (up to and including each of the plurality of viewpoints).

The input image data generated by rendering unit 10 may include visual (e.g., image), geometric, and temporal data corresponding to the one or more viewpoints. For example, the input image data for a given viewpoint may include an array of image pixels and their colors, using any suitable color space. In some embodiments, the input image data for a given viewpoint may include a depth map per each image pixel, motion vector per each image pixel, and the position and direction of the viewpoint in the rendered scene. Motion vector data may be provided with pixel or subpixel precision, and may be provided for a selected subset of pixels representing scene objects that are in motion. In some embodiments, rendering unit 10 may derive one or more types of image data from one or more other types of image data. For example, geometric data (e.g., a depth map) may be derived from visual data (e.g., a two-dimensional image) using, e.g., machine learning techniques to predict the depth of each pixel based on the image features.

In general, rendering unit 10 can use any suitable technique for generating 3D image data. For example, rendering unit 10 may include a game engine, a computer generated image (CGI) rendering tool, or the like. Rendering unit 10 may be implemented locally using on-board resources of light-field processing unit 100. Additionally or alternatively, rendering unit 10 may be remote, possibly running on a different machine from other components of light-field-processing system 100, and possibly in the cloud, and may communicate with light-field processing system 100 over a communication channel or other suitable medium.

In some embodiments, rendering unit 10 may generate the input image data at different, possibly lower frame rates than the frame rate for output data. In some embodiments, the input image data can be of a different, potentially lower pixel resolution than the target output resolution. Illustratively, the input resolution in terms of area may be approximately ¼ of the target output resolution, or less, without discernible impact on the resulting image quality. In some embodiments, the input image data may be of variable resolution.

In some embodiments, rendering unit 10 may generate the input image data based on a task definition, which provides specifications for the plurality of viewpoints that make up the 3D scene that is to be displayed. As an example, the specifications may identify the positions and direction of each of the plurality of viewpoints in the 3D scene, as well as the number of viewpoints. In some embodiments, the task definition may be received from an output unit 50, for example the display device and the tracking system, which is described in further detail below. The input image data generated by rendering unit 10 may or may not correspond to a viewpoint specified in the task definition.

In some embodiments, the viewpoint positions in the task definition can be shifted or adjusted to anticipate viewpoint positions at the time the rendered viewpoints are actually displayed, e.g., to achieve time-warping/late-warping or predictive motion compensation early in the rendering pipeline, as described for example in U.S. Pat. Publ. No. 2020/0342577, entitled "Virtual, augmented, and mixed reality systems and methods," which is incorporated by reference herein in its entirety. Additional movement (sub-pixel jitter) can be also introduced to achieve temporal anti-aliasing, as described for example in U.S. Pat. No. 10,853,918, entitled "Foveal adaptation of temporal anti-aliasing"; U.S. Pat. No. 8,577,184, entitled "System and method for super-resolution imaging from a sequence of color filter array (CFA) low-resolution images"; U.S. Pat. Publ. No. 2020/0342571, entitled "Temporal Supersampling for Foveated Rendering Systems"; and U.S. Pat. No. 8,224,107, entitled "Method and system for signal processing, for instance for mobile 3D graphic pipelines, and computer program product therefor," each of which is incorporated by reference herein in its entirety.

It is to be understood that rendering unit 10 is merely an example, and that light-field processing system 100 may use other sources of input image data. In some embodiments, the input image data may include real-world viewpoint data (e.g., image data captured using a camera system). In some embodiments, pre-recorded view data (e.g., task definitions and input image data) can be retrieved from a local or remote data storage medium. Such pre-recorded data may correspond to offline content. Under such conditions, a viewer may have limited freedom to move and look around in the pre-recorded data. In some embodiments, dynamic interpolation may be performed from the offline content to provide greater freedom of movement. These sources of input image data may be used rather than or in addition to the input image data from rendering unit 10.

Viewpoint reprojection unit 20 extrapolates or interpolates the input image data from rendering unit 10 to produce a plurality of synthesized viewpoints. The number and position of the synthesized viewpoints may match the number and position of the viewpoints in the output 3D scene, and may be specified in the task definition. That is, viewpoint reprojection unit 20 generates synthetic views looking at the 3D scene from each of the positions specified in the task definition.

A wide range of suitable viewpoint reprojection techniques may be used, and the particular technique may depend on factors such as the number of viewpoints supplied by rendering unit 10 in the input image data, their positions in relation to the positions of the output viewpoints, and the like. In some embodiments, viewpoint reprojection may be performed by shifting pixels of the image relative to the change in camera position and pixel depth, as described for example in U.S. Pat. No. 9,729,845, entitled "Stereoscopic view synthesis method and apparatus using the same"; U.S. Pat. No. 9,147,278, entitled "Parallax image generation device, parallax image generation method, program, and integrated circuit"; U.S. Pat. No. 9,558,579, entitled "Apparatus and method for synthesizing additional information while rendering object in 3D graphic-based terminal"; U.S. Pat. No. 8,767,042, entitled "Image processing apparatus and image processing method"; U.S. Pat. Publ. No. 2011/0157229, entitled "View synthesis with heuristic view blending"; and Schütz et al., "Rendering Point Clouds with Compute Shaders" (https://arxiv.org/pdf/1908.02681.pdf), each of which is incorporated by reference herein in its entirety. In some embodiments, viewpoint reprojection may be performed by reprojecting a viewpoint onto a 3D body, as described for example in U.S. Pat. No. 8,619,071, entitled "Image view synthesis using a three-dimensional reference model"; U.S. Pat. No. 9,053,573, entitled "Systems and methods for generating a virtual camera viewpoint for an image"; and Fachada et al., "Depth image based view synthesis with multiple reference views for virtual reality," (https://dipot.ulb.ac.be/dspace/bitstream/2013/270850/3/paper_3DTV_CON_final.pdf), each of which is incorporated by reference herein in its entirety. In some embodiments, viewpoint reprojection may be performed using artificial intelligence techniques, as described for example in U.S. Pat. Publ. No. 2019/0311524, entitled "Method and apparatus for real-time virtual viewpoint synthesis"; and Mildenhall et. al, "NeRF: Representing Scenes as Neural Radiance Fields for View Synthesis," (https://arxiv.org/pdf/2003.08934.pdf), each of which is incorporated by reference herein in its entirety.

The image data generated for each synthesized viewpoint may generally include the same visual (e.g., image), geometric, and temporal data as the input image data for the rendered viewpoints generated by rendering unit 10. In some embodiments, the image data for the synthesized viewpoints may further include a confidence level corresponding to each synthesized pixel in the image. The confidence level generally provides an estimate of the quality of the synthesized data. The confidence levels for each pixel collectively form a confidence map for each viewpoint. The confidence level may be represented with any suitable precision, such as a binary value (1 or 0) or a scalar value.

When the input image data from rendering unit 10 is provided in lower resolution than the desired output resolution, viewpoint reprojection unit 20 may perform scaling (e.g, upscaling or downscaling) such that the synthesized image data is at the desired output resolution. In some embodiments, the confidence levels assigned to each pixel may reflect the scaling process, including whether the synthesized viewpoint is scaled by a factor that is not a natural number. Illustrative processes for determining confidence levels based on scaling are described, for example, in U.S. Pat. No. 8,660,362, entitled "Combined depth filtering and super resolution"; U.S. Pat. No. 10,930,054, entitled "Method and system of robust virtual view generation between camera views"; and U.S. Pat. No. 10,803,553, entitled "Systems and methods for image resolution enhancement," each of which is incorporated by reference herein in its entirety.

In some embodiments, the confidence level assigned to each pixel may reflect movement, e.g., changes of the position of the viewpoint or objects within the viewpoint from one frame to the next. For example, movement can be identified by rendering unit 10, e.g., as subpixel jitter, which is described for example in U.S. Pat. No. 10,229,529, entitled "System, method and computer program product for implementing anti-aliasing operations using a programmable sample pattern table"; and U.S. Pat. No. 10,362,289, entitled "Method for data reuse and applications to spatio-temporal supersampling and de-noising," each of which is incorporated by reference herein in its entirety.

Accordingly, in some embodiments, the confidence level may correspond to a combined metric that is based on one or more of an scaling confidence (e.g., a confidence level based on scaling of the viewpoint) and a reprojection (or synthesis) confidence (e.g., a confidence level based on movement of the viewpoint). The combined confidence level may provide a more accurate measure of the estimated quality of the synthesized data relative to either measure individually. For example, consider an illustrative example in which confidences levels are represented as scalar values in the interval [0,1]. In such examples, an scaling confidence may be calculated as a measure of alignment of the input with respect to output pixels using Gaussian weights, as described, for example, in U.S. Pat. No. 10,362,289, discussed above. For example, an output pixel that is spatially aligned with an input pixel (e.g., located at the same xy coordinate) may be assigned a high confidence (e.g., 1) because little or no interpolation is performed, whereas an output pixel that is not spatially aligned with an input pixel (e.g., located in between input pixels) may have a low confidence because the output pixel is the product of significant interpolation. A synthesis confidence may encode the quality of reprojection using an exponential decay over the reprojection error (exp(−error)), where 'error' is the reprojection error, e.g., the distance between the projected image point and the input image point in pixels. Confidences can be combined in any suitable manner, such as by applying a predetermined mathematical function (e.g., multiplying each of the confidence levels together), using a machine learning model, or the like.

Cache reprojection unit 30 is coupled to viewpoint reprojection unit 20 and cache unit 60. Cache reprojection unit 30 receives geometry information for each synthesized viewpoint generated by viewpoint reprojection unit 20, such as the position and direction of each synthesized viewpoint. In some embodiments, cache reprojection unit 30 may further receive motion vectors for each pixel in the synthesized viewpoint, when motion vector information is available. Cache reprojection unit 30 also retrieves cached viewpoints from cache unit 60. The cached viewpoints may correspond to viewpoint data that was output in a previous frame, e.g., the last frame displayed, as described further below.

Like viewpoint reprojection module 20, cache reprojection module 30 produces a plurality of synthesized cached viewpoints corresponding to each viewpoint declared in the task definition. Each synthesized cached viewpoints may be based on one or more cached viewpoints, which may be modified based on related data for the viewpoint, such as the motion vectors. For example, because the cached image data is from a previous frame (time step), motion vectors may be used to warp (shift) moving objects to their estimated present pose. Examples of cache reprojection processes are described in further detail in U.S. Pat. No. 10,362,289, entitled "Method for data reuse and applications to spatio-temporal supersampling and de-noising"; and U.S. Pat. Appl. No. 2021/0014450, entitled "Synergistic temporal anti-aliasing and coarse pixel shading technology"; each of which is incorporated by reference herein in its entirety. In some embodiments, the cached image data may already be at the desired output resolution, so scaling may not be performed.

In addition, like viewpoint reprojection unit 20, cache reprojection unit 30 may generate a confidence map for each synthesized cache viewpoint. For example, the confidence map may indicate locations where the reprojected images are likely to be invalid, e.g., because of movement associated with a viewpoint or an object within the viewpoint. The confidence map may use a combined confidence level, as described above with reference to viewpoint reprojection unit 20.

Blending unit 40 combines the plurality of synthesized viewpoints from viewpoint reprojection unit 20 and cache reprojection unit 30 to yield a plurality of blended viewpoints. In some embodiments, blending unit 40 may combine the viewpoints on a per pixel basis based on the confidence maps. For example, when the confidence maps include binary confidence levels (1 or 0), blending unit 10 may combine the viewpoints on a pixel-by-pixel basis according to the following decision table.

| Viewpoint (20) confidence level | Cache (30) confidence level | Data selected for blended output |
| --- | --- | --- |
| 1 | 1 | Combine viewpoint (20) and cache (30) |
| 1 | 0 | Viewpoint (20) only |
| 0 | 1 | Cache (30) only |
| 0 | 0 | Combine viewpoint (20) and cache (30) |

Combining pixel data from viewpoint reprojection unit 20 and cache reprojection unit 30, as shown in the first and fourth rows, may include taking an average of the pixel values, or another suitable approach. A similar decision table may be used when the confidence level is represented with finer granularity (e.g., a scalar value). Consistent with such embodiments, the binary operators in the above decision table may be substituted with linear combinations based on weighting factors (e.g., factors derived from the confidence levels).

Output device 50 displays the plurality of blended viewpoints. Output device 50 may include any suitable visual output device, including those without native light-field capabilities. For example, the viewpoints may be displayed via a near-eye light-field projector, a headset, a 3D visualization device (e.g., a multi-view television), a standard display (e.g., flat-panel display), or the like. An example of a near-eye light-field projector is described in further detail in PCT Publ. No. WO2018091984A1, entitled "Near-eye sequential light-field projector with correct monocular depth cues," filed Sep. 19, 2017, which is incorporated by reference herein in its entirety. This type of projector includes a two-dimensional array of small projectors positioned next to each other, each sending an image to the eye from a different position corresponding to its location in the array. The projector may be time-multiplexed, such that the viewpoints of a frame are projected in a fast sequence to create the light-field.

In some embodiments, output device 50 may display the plurality of blended viewpoints from points of view that correspond to those declared in the task definition. Output device 50 may then generate or update the next task definition that is provided to light-field processing system 100 for generating the next frame. The task definition may be updated based on tracking functionality of output device 50, e.g., the ability to track the changes in the position and direction of the user's view.

Cache unit 60 that stores data associated with the plurality of blended viewpoints that were output in one or more previous frames, e.g., the last frame preceding the current frame, or the last N frames. The stored information may include the visual (image) data associated with the previous frame, such as pixel color data, which in some examples may be stored in the full output resolution. In some embodiments, the stored information for each viewpoint may include a depth map, motion vectors, timestamp information, geometry information, or other information based on the configuration of the reprojection units 20 and 30, the size of cache unit 60, and the like. In some embodiments, the stored information in the cache may be compressed.

In some embodiments, cache unit 60 may store image data for each of the blended viewpoints in the previous frame, or a subset of viewpoints such as the corner or edge viewpoints (those located at the corners or edges of the array). When fewer than all of the plurality of viewpoints are stored, additional data may be stored in cache unit 60 to assist with reprojection when rendering the next frame. Consistent with such embodiments, light-field processing system 100 may be modified such that the viewpoint reprojection unit 20 renders the viewpoints that were not stored in cache unit 60 prior to further processing by cache reprojection unit 30.

Those skilled in the art would appreciate a number of advantages associated with using light-field processing system 100 to generate and display light-fields. Because system 100 generates viewpoints that are a blended combination of synthesized viewpoints, the quality of the each of the synthesized viewpoints, individually, may be lower than the desired output quality. For example, a synthesized viewpoint from reprojection unit 20 or 30 may contain holes, defects, and other artifacts resulting from imperfect reprojection. These imperfections may be unavoidable, or may be the result of choosing to use a reprojection process that offers lower accuracy, but possibly higher computational efficiency and speed, than alternative processes.

Whereas these imperfections in the synthesized viewpoints may otherwise degrade the output image quality, in system 100 the impact of these imperfections may be reduced or eliminated in the output viewpoints. For example, regions of a synthesized viewpoint that contain, or are statistically likely to contain, imperfections may be identified in the confidence map using the combined confidence level. Blending unit 40 may then omit or assign a low weight to those regions when generating the blended viewpoint that is output and displayed, such that the imperfections do not appear, or appear in diminished fashion, in the output viewpoint. Moreover, when system 100 is used to output dense multi-view data (e.g., multiple views projected recombine in the user's eye), imperfections that appear in one viewpoint may be compensated by other viewpoints, further reducing the impact of the imperfections on the quality of the perceived results.

More generally, it is observed that errors of synthesized viewpoints and errors of viewpoints derived from cache may occur (and often do occur) at different places. By blending these viewpoints, system 100 creates a result that may be higher quality than the either approach used alone in a computationally efficient manner. To facilitate blending, system 100 identifies which regions of the viewpoints have imperfections, such as by using confidence levels (as described above), by determining the location of transparent pixels, or by another suitable mechanism.

The ability of system 100 to mask imperfections in the synthesized viewpoints enables system 100 to use computationally efficient rendering and reprojection processes. For example, rendering unit 10 may generate one, or few, input viewpoints relative to the total number of viewpoints in the 3D scene, and the rendered viewpoint may be of low resolution relative to the desired output resolution. That is, a high degree of upscaling can be applied during reprojection of the rendered viewpoint while retaining the desired output image quality. In a similar manner, the reprojection processes used by reprojection units 20 and 30 may be selected for high performance, even when their results produce lower quality synthesized viewpoints than alternative approaches. When using pre-rendered image data (rather than or in addition to real-time rendering data from rendering unit 10), a high degree of compression—including lossy compression techniques—may be applied to pre-rendered image data for efficient storage. As a result, less storage resources may be used, a larger number of pre-rendered viewpoints may be stored (providing more freedom of movement to the user in an offline mode), or the like.

By reducing the computational demands of rendering unit 10 and reprojection units 20 and 30, system 100 may be configured more flexibly than alternative approaches. For example, rendering unit 10 and reprojection units 20 and 30 may be implemented using on-board (e.g., mobile) computing resources of system 100 rather than or in addition to remote (e.g., cloud-based) resources. For instance, the computing resources may include an application specific integrated circuit, a field programmable gate array, or the like, which is located at an endpoint device, such as a headset. Similarly, pre-rendered viewpoints may be stored using on-board (e.g., mobile) storage resources of system 100 rather than or in addition to remote (e.g., cloud-based) resources.

Figure 2:
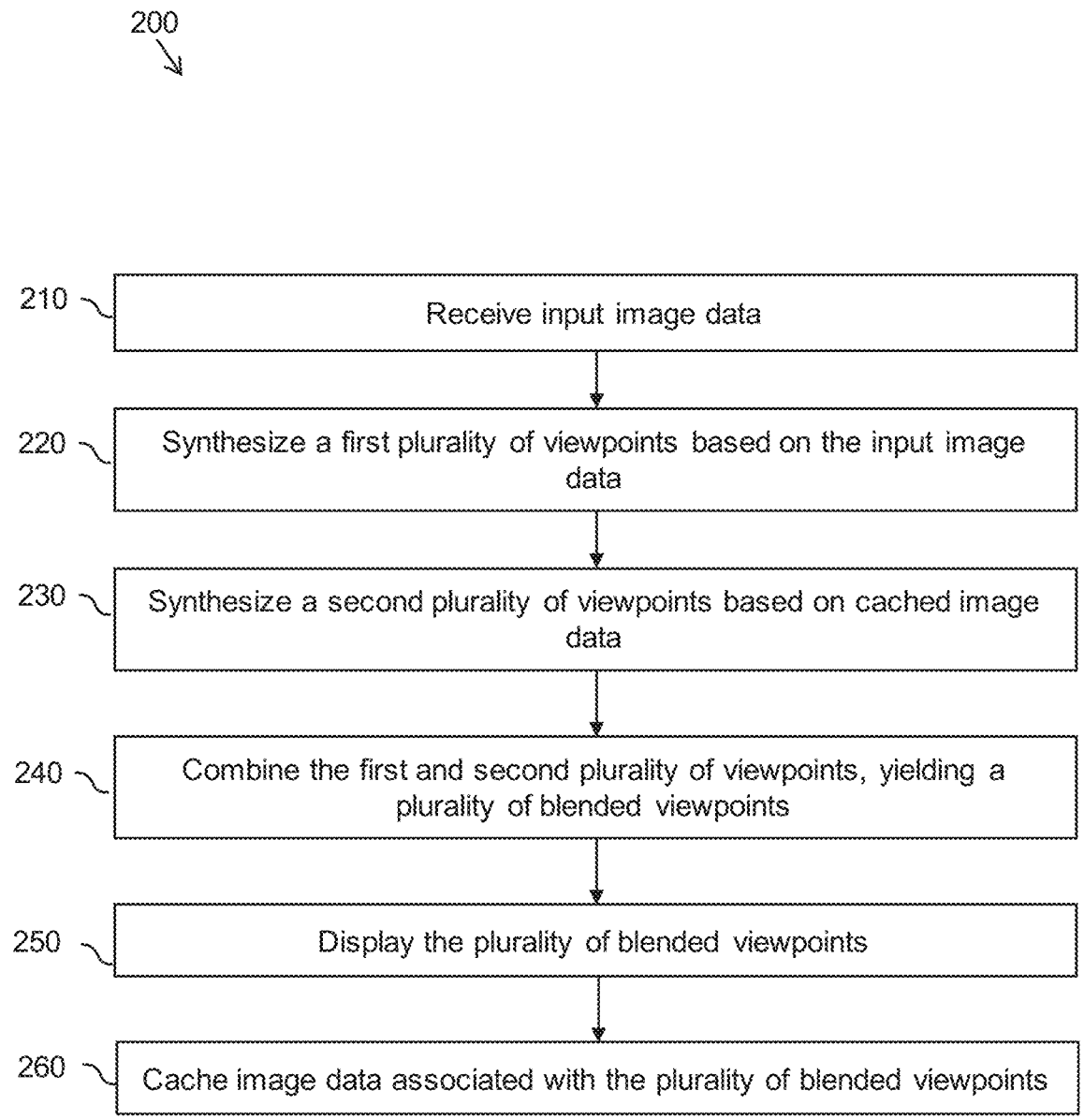
FIG. 2 shows a simplified diagram of a light-field processing method according to some embodiments.

FIG. 2 is a simplified diagram of a light-field processing method 200 according to some embodiments. In some embodiments consistent with FIG. 1, method 200 may be performed by light-field processing system 100 when generating and displaying a 3D scene.

At method step 210, input image data is received. In some embodiments consistent with FIG. 1, the input image data may be received from a local or remote rendering unit (e.g., a gaming engine, a CGI tool, or the like), such as rendering unit 10. Additionally or alternatively, the input image data may correspond to pre-rendered image data, real-world image data (e.g., data from a camera), or the like. Consistent with such embodiments, step 210 may include retrieving pre-rendered image data from storage (e.g., long-term storage) and decompressing the pre-rendered image data. In some embodiments, the input image data may correspond to a subset of the plurality of viewpoints in the 3D scene, e.g., one viewpoint. The image data may be of a lower resolution than the desired output resolution. In some embodiments, the input image data may be received at an endpoint device from a remote source. For example, the endpoint device may be a headset capable of projecting the light-fields generated by method 200 to a user (e.g., the wearer). The headset (or other endpoint device) may include local computing resources, such as an application specific integrated circuit or a field programmable gate array, that are used to perform method 200. In this manner, method 200 may provide for efficient transmission of light-field data to the headset from a remote source of image data.

At method step 220, a first plurality of viewpoints are synthesized based on the input image data. In some embodiments consistent with FIG. 1, the first plurality of viewpoints may be synthesized using a viewpoint reprojection unit, such as viewpoint reprojection unit 20. Synthesizing the first plurality of viewpoints may include scaling the input image data to the desired output resolution and interpolating or extrapolating the image data to match the positions and directions of the output viewpoints (which may be declared in a task definition, as described above). The number and positions of the first plurality of viewpoints may correspond to the number and positions of the viewpoints displayed in the 3D scene. In some embodiments, synthesizing the first plurality of viewpoints may account for motion of the viewpoints (or objects within the viewpoints), e.g., based on motion vectors associated with each pixel.

In some embodiments, step 220 may further include generating a confidence map for each of the first plurality of viewpoints. The confidence map provides a pixel-by-pixel estimate of the quality of the synthesized image data. As described above, the confidence levels in the confidence map may correspond to a combined metric that is based on one or more of an scaling confidence (e.g., a confidence level based on the amount of scaling applied to the viewpoint) and a reprojection confidence (e.g., a confidence level based on the amount of movement of the viewpoint).

At method step 230, a second plurality of viewpoints are synthesized based on cached image data. In some embodiments consistent with FIG. 1, the second plurality of viewpoints may be synthesized using a cache reprojection unit, such as cache reprojection unit 30. Synthesizing the second plurality of viewpoints may include retrieving an image history from a cache, such as cache unit 60. The image history may include cached image data associated with one or more cached frames, such as the last frame preceding the current frame. The cached image data may include a subset of the output image data associated with the last frame, such as the visual (image) data, and may optionally include additional data such as motion vector data. In some embodiments, step 230 may include modifying the cached image data based on additional data associated with the first plurality of viewpoints, such as geometric and motion vector information. Like the first plurality of viewpoints, the number and positions of the second plurality of viewpoints may correspond to the number and positions of the viewpoints displayed in the 3D scene. Because the cached image data may have the same resolution as the desired output resolution, scaling of the cached image data may be omitted. As in step 220, step 230 may further include generating a confidence map for each of the second plurality of viewpoints.

At method step 240, the first and second plurality of viewpoints are combined, yielding a plurality of blended viewpoints. In some embodiments consistent with FIG. 1, the second plurality of viewpoints may be combined using a blending unit, such as blending unit 40. Consistent with such embodiments, combining the first and second plurality of viewpoints may include comparing the confidence maps associated with the first and second plurality of viewpoints, e.g., in a pixel-by-pixel manner. Based on the confidence maps, a decision is made at each pixel whether to use image data from the first or second plurality of viewpoints, whether to combine the image data from the first or second plurality of viewpoints (e.g., by averaging the image data in a weighted or unweighted manner), or the like.

At method step 250, the plurality of blended viewpoints are displayed. In some embodiments consistent with FIG. 1, the plurality of blended viewpoints may be displayed via an output device, such as output device 50. For example, a processor may display the plurality of blended viewpoints by transmitting image data corresponding to the plurality of blended viewpoints to the output device. In some embodiments, displaying the plurality of blended viewpoints may include performing time-multiplexing, such that the viewpoints of a frame are projected in a fast sequence to create the light-field.

At method step 260, image data associated with the plurality of blended viewpoints is cached. In some embodiments consistent with FIG. 1, the plurality of blended viewpoints may be cached using a cache unit, such as cache unit 60. In some embodiments, step 260 may occur at substantially the same time as step 250. The image data that is cached may include all or a subset of the image data associated with the plurality of blended viewpoints. For example, the cached image data may be associated with a subset of viewpoints among the plurality of viewpoints (e.g., edge or corner viewpoints in an array of viewpoints), the cached data may include a subset of image data for each viewpoint (e.g., including the visual (image) data and excluding depth information, for example), or the like. In some embodiments, caching the image data may include compressing the image data for efficient storage.

Figure 3:
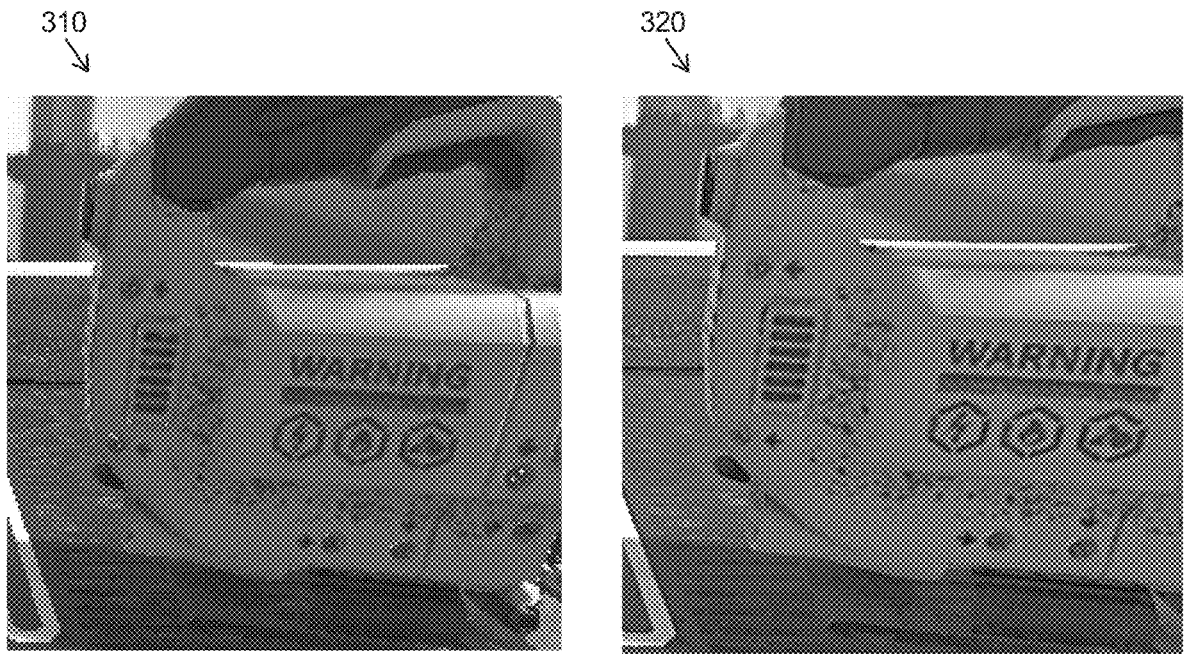
FIG. 3 shows an illustrative example of a rendered image and a blended image generated using the techniques disclosed herein.

FIG. 3 is an illustrative example of a rendered image 310 and a blended image 320 generated using the techniques disclosed herein. Rendered image 310 generally corresponds to an image such as one that may be generated by rendering unit 10, which is provided as an input to light-field processing system 100. As illustrated, rendered image 310 generally has a low resolution. Blended image 320 generally corresponds to an image such as one that may be generated by blending unit 40, which is provided as an output of system 100. As illustrated, blended image 320 generally has a higher resolution and improved image quality relative to rendered image 310.

FIG. 4 is an illustrative example of a near-eye light-field projector 400 according to some embodiments. In some embodiments consistent with FIGS. 1-3, near-eye light-field projector 400 may correspond to display unit 50. As shown in FIG. 4, near-eye light-field projector 400 includes a two-dimensional array of small projectors positioned next to each other, each sending an image to the eye from a different position corresponding to its location in the array, in this illustration a 6×6 array that projects a total of 36 images.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, a light-field projector (as described above), or the like, for displaying information to the user and a keyboard and a pointing device, (e.g., a mouse or a trackball), a user tracking device (e.g., a head or eye tracking device within a headset), or the like, by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The invention claimed is:

1. A method for generating light-field data corresponding to a plurality of viewpoints in a three-dimensional scene, the method comprising:
    receiving, by at least one computer processor, input image data;
    synthesizing, by the at least one computer processor, a first plurality of viewpoints based on the input image data, wherein synthesizing the first plurality of viewpoints comprises generating a first plurality of confidence maps corresponding to the first plurality of viewpoints, wherein each confidence map comprises a plurality of confidence levels, and wherein each confidence level estimates a quality of a synthesized pixel among the first plurality of viewpoints;
    synthesizing, by the at least one computer processor, a second plurality of viewpoints based on cached image data associated with one or more viewpoints displayed in a previous frame, wherein synthesizing the second plurality of viewpoints comprises modifying the cached image data based on an estimated motion occurring between the previous frame and a current frame;
    combining, by the at least one computer processor, the first and second plurality of viewpoints, yielding a plurality of blended viewpoints;
    displaying, by the at least one computer processor, the plurality of blended viewpoints; and
    caching, by the at least one computer processor, image data associated with the plurality of blended viewpoints.

2. The method of claim 1, wherein the input image data is associated with a subset of viewpoints among the plurality of viewpoints in the three-dimensional scene.

3. The method of claim 1, wherein the input image data has a lower resolution than a resolution of the displayed plurality of blended viewpoints.

4. The method of claim 1, wherein synthesizing the first plurality of viewpoints includes scaling the input image data.

5. The method of claim 1, wherein synthesizing the second plurality of viewpoints includes modifying the cached image data based on data associated with the first plurality of viewpoints.

6. The method of claim 1, wherein:
    synthesizing the second plurality of viewpoints comprises generating a second plurality of confidence maps corresponding to the second plurality of viewpoints.

7. The method of claim 6, wherein each confidence map among the first plurality of confidence maps and the second plurality of confidence maps comprises a plurality of confidence levels, and wherein each confidence level estimates a quality of a synthesized pixel among the first plurality of viewpoints and the second plurality of viewpoints.

8. The method of claim 7, wherein each confidence level includes one or more of a binary value or a scalar value.

9. The method of claim 7, wherein each confidence level is determined based on at least an scaling confidence and a reprojection confidence.

10. The method of claim 6, wherein combining the first and second plurality of viewpoints further comprises determining, for each pixel, based on comparing the first and second plurality of confidence maps, whether to use image data from the first plurality of viewpoints, the second plurality of viewpoints, or a combination thereof.

11. The method of claim 1, wherein displaying the plurality of blended viewpoints comprises time-domain multiplexing the plurality of blended viewpoints.

12. The method of claim 1, wherein caching the image data is performed at substantially the same time as displaying the plurality of blended viewpoints.

13. The method of claim 1, wherein caching the image data comprises compressing the image data.

14. The method of claim 1, wherein the input image data comprises compressed input image data, and wherein the method further comprises decompressing the compressed input image data.

15. The method of claim 1, wherein the compressed input image data comprises pre-rendered image data.

16. The method of claim 1, wherein the input image data is received at an endpoint device from a remote source.

17. The method of claim 16, wherein the endpoint device comprises a headset configured to project the plurality of blended viewpoints to a user.

18. The method of claim 16, wherein the at least one computer processor comprises at least one of an application specific integrated circuit or a field programmable gate array of the endpoint device.

19. A system for generating light-field data corresponding to a plurality of viewpoints in a three-dimensional scene, the system comprising:
- at least one computer processor configured to:
  - receive input image data;
  - synthesize a first plurality of viewpoints based on the input image data, wherein synthesizing the first plurality of viewpoints comprises generating a first plurality of confidence maps corresponding to the first plurality of viewpoints, wherein each confidence map comprises a plurality of confidence levels, and wherein each confidence level estimates a quality of a synthesized pixel among the first plurality of viewpoints;
  - synthesize a second plurality of viewpoints based on cached image data associated with one or more viewpoints displayed in a previous frame, wherein synthesizing the second plurality of viewpoints comprises modifying the cached image data based on an estimated motion occurring between the previous frame and a current frame;
  - combine the first and second plurality of viewpoints, yielding a plurality of blended viewpoints;
  - display the plurality of blended viewpoints; and
  - cache image data associated with the plurality of blended viewpoints.

20. An article of manufacture for generating light-field data corresponding to a plurality of viewpoints in a three-dimensional scene, the article of manufacture comprising:
- a non-transitory processor readable medium; and
- instructions stored on the medium;
- wherein the instructions are configured to be readable from the medium by at least one computer processor communicatively coupled to and configured to cause the at least one computer processor to operate so as to:
  - receive input image data;
  - synthesize a first plurality of viewpoints based on the input image data, wherein synthesizing the first plurality of viewpoints comprises generating a first plurality of confidence maps corresponding to the first plurality of viewpoints, wherein each confidence map comprises a plurality of confidence levels, and wherein each confidence level estimates a quality of a synthesized pixel among the first plurality of viewpoints;
  - synthesize a second plurality of viewpoints based on cached image data associated with one or more viewpoints displayed in a previous frame, wherein synthesizing the second plurality of viewpoints comprises modifying the cached image data based on an estimated motion occurring between the previous frame and a current frame;
  - combine the first and second plurality of viewpoints, yielding a plurality of blended viewpoints;
  - display the plurality of blended viewpoints; and
  - cache image data associated with the plurality of blended viewpoints.

21. The method of claim 1, wherein the geometry data comprises motion vector data.

* * * * *